Jan. 9, 1940.     A. A. MOLITOR     2,186,172
FASTENING INSERTING MACHINE
Filed Aug. 29, 1938
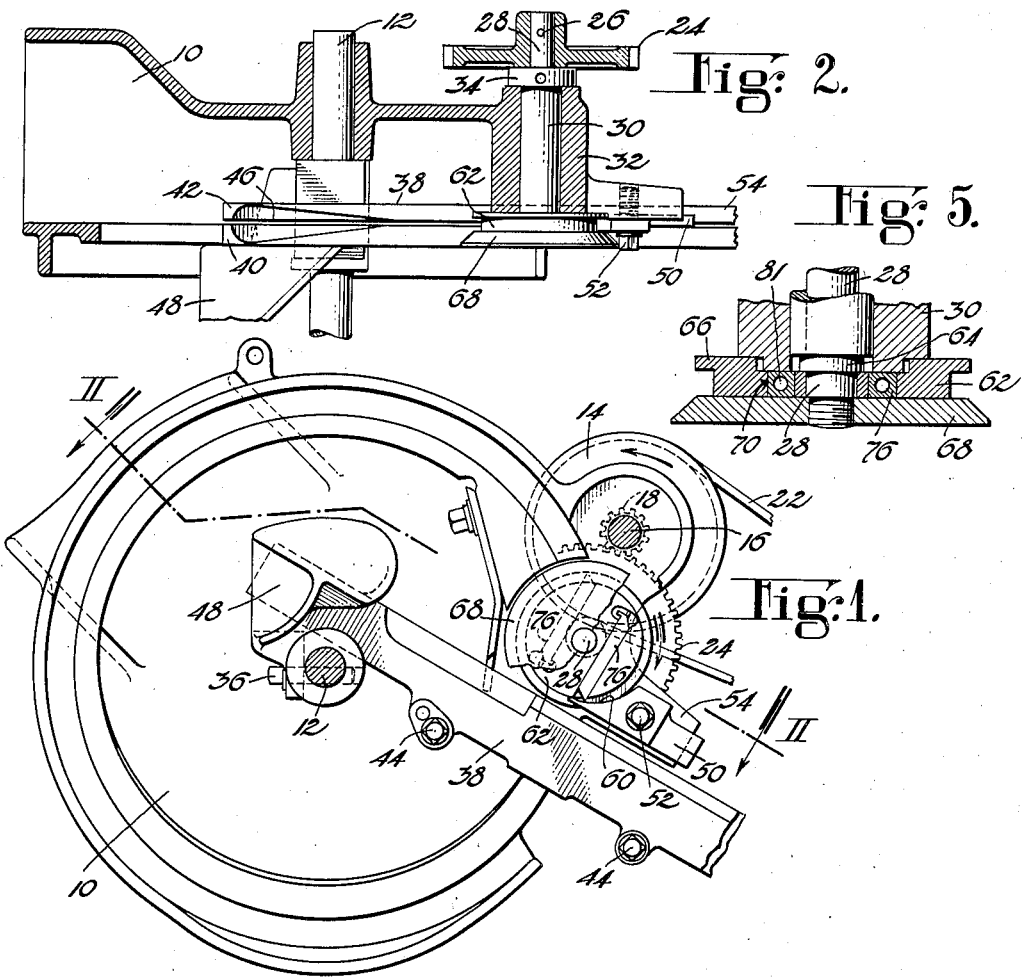
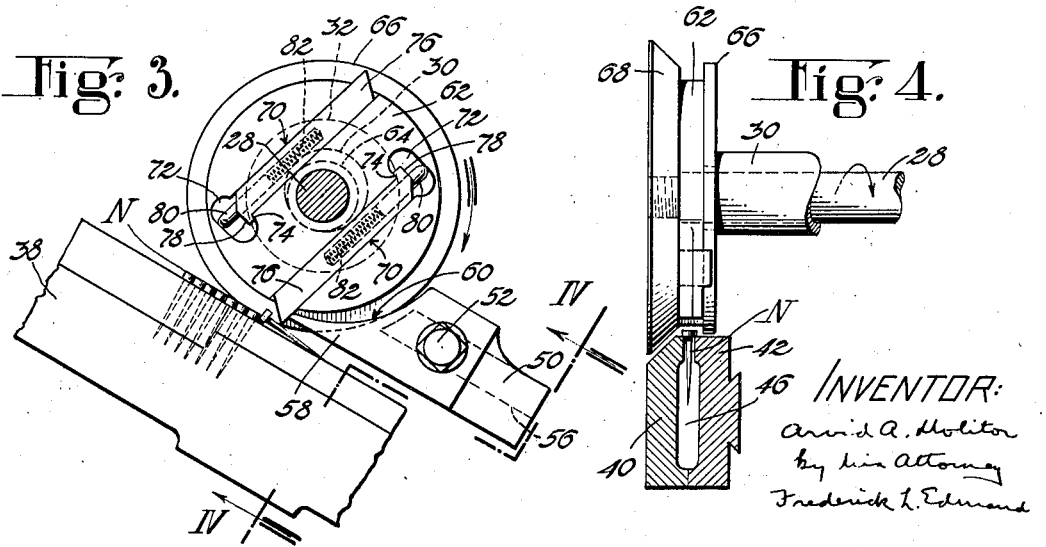
INVENTOR:
Arvid A. Molitor
By his Attorney
Frederick L. Emery Patented Jan. 9, 1940

2,186,172

UNITED STATES PATENT OFFICE 2,186,172

FASTENING INSERTING MACHINE

Arvid A. Molitor, Danvers, Mass., assignor to United Shoe Machinery Corporation, Borough of Flemington, N. J., a corporation of New Jersey Application August 29, 1938, Serial No. 227,269

10 Claims. (Cl. 1—6)

This invention relates to improvements in fastening-inserting machines and is illustrated herein by way of example as embodied in a machine of the general type disclosed in Letters Patent of the United States No. 1,030,775, granted June 25, 1912, in the name of George Goddu.

Machines of the type referred to are arranged to deliver fastenings such as nails from a rotary hopper to driving instrumentalities through one or more inclined raceways, the nails resting with their heads on the top of the raceway and their shanks extending into the opening thereof as they pass down the raceway by gravity. Sometimes, however, a nail does not enter the raceway in the proper position and must be dislodged before it reaches the driving instrumentalities. To accomplish this machines of this type are usually provided with a guard member located over the raceway for engaging and arresting the downward movement of the misplaced nail. A nail clearing member is provided for dislodging the nail held by the guard and rejecting it from the raceway or causing it to become properly positioned therein, this member usually comprising a rotary wheel or disk provided around its periphery with a multiplicity of rigid projections or teeth for engaging the nail and throwing it off the raceway. It has been found, however, that with many of the nail clearing wheels now in use the misplaced nail is sometimes caught in the rigid teeth and is carried around the wheel until it jams against the guard thereby clogging the machine and sometimes breaking the guard. Moreover, with rigid teeth on the clearing wheel the guard member must have a sharp point to permit the clearing wheel to be adjusted sufficiently close to the end of the guard to be in a position to engage the misplaced nails. This necessitates a fine adjustment to be maintained between the clearing wheel and guard and the sharp point required on the guard causes it to be easily broken.

An object of the present invention is to provide an improved nail clearing device for use in machines of the type referred to in which the above difficulties will be eliminated.

To the attainment of this object the invention provides, in accordance with one feature, an improved nail clearing device comprising a rotary disk provided with a nail-engaging finger or fingers which will yield under pressure. As illustrated, the fingers are slidably mounted in slots in the disk and their outer ends extend beyond its periphery into positions to engage the misplaced nails. The yield is provided by spring-pressed plungers preferably supported by the fingers and bearing against the inner ends of the slots in the disk, these plungers normally maintaining the fingers at their outer limit of sliding movement which is determined by projections on the fingers engaging shoulders at the inner ends of the slots.

The construction is such that the fingers engage the guard during rotation of the disk and are depressed thereby but, on leaving the end of the guard, snap outwardly into position to engage an improperly positioned nail and reject it from the raceway or cause it to become properly positioned therein. It will be seen that with the present construction there is no danger of the fingers jamming a nail against the guard and breaking its point. Moreover, no close adjustment is required between the guard and the clearing wheel to permit the fingers to engage the nails and, consequently, the end of the guard may have a relatively thick or blunt end without decreasing its effectiveness or that of the clearing device. In addition to the foregoing, the illustrated device may be provided with only two nail-engaging fingers instead of a multiplicity of fingers, thereby rendering it practically impossible for a nail to get caught by the fingers and be carried around the disk and dropped on the guard where it might jam between the disk and the guard.

With the above and other objects and features in view, the invention will now be described in connection with the accompanying drawing and will thereafter be pointed out in the claims.

In the drawing,

Fig. 1 is a side elevation, partly broken away and in section, of the nail feeding mechanism of the fastening-inserting machine in which the present invention is embodied;

Fig. 2 is a longitudinal section taken on the line II—II of Fig. 1;

Fig. 3 is an enlarged detail view of a portion of the nail feeding mechanism shown in Fig. 1 with the nail clearing device in a different position;

Fig. 4 is a sectional view taken on the line IV—IV of Fig. 3; and

Fig. 5 is a sectional view of the nail-clearing device and its support.

As disclosed in the patent referred to, the fastening-inserting machine is provided with a hopper 10 secured to a countershaft 12 mounted in a bracket (not shown) in the head of the machine. A rotatable pulley 14 secured to a shaft 16 on the hopper (Fig. 1) drives a pinion 18 also secured to the shaft 16, the pinion 18 meshing with a gear 24 secured by a pin 26 to a rotatable shaft 28. The shaft 28 extends through an eccentric bushing 30 mounted in a bearing 32 formed on a stationary portion of the hopper 10. The bushing 30 has a shoulder 34 at its inner end (Fig. 2) whereby it may be turned in the bearing 32 to adjust the shaft 28 relatively to the bearing. The pulley 14 is rotated in a counterclockwise direction, as viewed in Fig. 1, by a belt 22 driven from the power shaft of the machine and, accordingly, the pinion gear 18 will rotate in the same direction to rotate the gear 24 in an opposite direction. For further details of this driving mechanism reference may be had to the patent mentioned.

Extending inside the hopper 10 and secured by a screw 36 to the countershaft 12 is a nail raceway 38 which is inclined downwardly at a substantial angle to the horizontal and is secured at its lower end (not shown) to a stationary portion of the machine head. As shown in Figs. 2 and 4, the raceway 38 comprises sections 40 and 42 secured together by screws 44 to leave an opening or slot 46 through which the fastenings, such as the nails N, travel as they are conducted from the hopper to the driving instrumentalities of the machine. The nails are carried in the hopper by projections or lips on the rotary portion 14 and are dropped into a tray 48 arranged to deliver the nails to the raceway which they enter with their shank portions extending through the opening 46 and their heads resting on the top of the raceway, that is, on the upper surfaces of the sections 40, 42. The nails are then caused by gravity to travel down the raceway to the fastening-inserting instrumentalities.

It sometimes happens that a nail enters the raceway in the wrong position with its shank extending across the raceway and proceeds to travel downwardly toward the driving instrumentalities. To insure that the nail will not reach the driving instrumentalities the machine is provided with a guard member 50 secured by a screw 52 to a projection 54 on the hopper, the guard being provided with an inwardly projecting rib 56 arranged to enter a corresponding slot in the projection 54 to prevent the guard from turning about the screw 52. As shown in Figs. 1 and 3, the guard has a forwardly projecting lip 58 at its upper portion and the upper side of this lip is curved to form a cam surface 60 which is eccentric with respect to the axis of the shaft 28 in any of its positions of adjustment. The guard 50 is located directly over the opening or slot 46 in the raceway 38 and its lower side is spaced above the raceway only a sufficient distance to permit a nail to pass thereunder provided its head is resting in a proper position on the top of the raceway and its shank is extending into the opening 46. Consequently, if a nail should move down the raceway in an improper position with its head at an angle to the top of the raceway and its shank lying across the opening 46, the guard 50 would engage that nail and arrest its movement toward the driving instrumentalities. The nail clearing device would then operate to engage the misplaced nail and either dislodge it entirely from the raceway or cause it to become properly positioned therein so that it could pass under the guard 50.

The nail clearing device, as best shown in Figs. 3 and 5, comprises a disk 62 secured against a shoulder 64 on the shaft 28 in such a position that it lies directly over the opening 46 in the raceway. The disk is provided at its inner side with an annular flange 66 and is secured against the shoulder 64 by another disk 68 threaded on a reduced end of the shaft 28. The disk 68 has its edge face beveled inwardly to coincide with a similar bevel on the section 40 of the raceway, thereby preventing nails from getting out of control of the clearing device while they are being acted upon thereby.

The disk 62 is provided with a pair of slots 70 (Figs. 3 and 5) which extend inwardly from the periphery of the body portion of the disk and terminate inside said periphery in the form of enlarged openings 72 which produce shoulders 74 at the inner ends of the slots. As best shown in Fig. 3, the slots are substantially parallel to each other and their outer ends are diametrically opposite on the disk 62.

Mounted for sliding movement lengthwise of the slots 70 are nail engaging fingers 76 the inner ends of which extend into the enlarged portions 72 of the slots and are provided with projections 78 arranged to engage the shoulders 74 and thereby to limit sliding movement of the fingers outwardly of the disk, that is, toward its periphery. The fingers are of such lengths that their forward ends project a short distance beyond the periphery of the body portion of the disk 72 at the outer limit of their sliding movement and these ends are beveled to form points adapted to engage the nails. The fingers 76 are normally maintained at the outer limit of their movement by spring-pressed plungers 80 which enter holes 81 formed lengthwise of the fingers and bear at their outer ends against the inner ends of the slots. Between the plungers 80 and the inner ends of the holes 81 are compression springs 82 which cause the plungers to constantly urge the fingers toward their outer position but permit the fingers to yield inwardly under pressure applied to their outer ends a distance sufficient to bring the nail-engaging ends of the fingers into substantial alinement with the periphery of the body portion of the disk 62.

In the operation of the nail clearing device, the fingers 76 engage the cam surface 60 of the guard 50 as the disk is rotated in a clockwise direction, as viewed in Figs. 1 and 3, and are depressed by this surface until they reach the end of the forwardly projecting lip 58, at which point they snap off the end of the lip and outwardly into a position to engage the misplaced nail and dislodge it from the raceway or cause it to become properly positioned therein. Since the fingers yield in the manner described there is no necessity for a close adjustment between the clearing device and the guard member 50 because after leaving the guard the fingers will be sufficiently close to the raceway to engage any misplaced nail. Moreover, the yielding action of the fingers prevents them from jamming a nail against the guard if a nail should happen to fall thereon. Since there are only two nail-engaging fingers there is practically no possibility of a nail catching on a finger and being carried around the disk and becoming jammed between the guard and the body portion of the disk.

While the invention has been disclosed herein with reference to a particular type of fastening-inserting machine, it should be understood that it is not limited in its utility and operation to a machine of that type but may be used with equal advantages in any machine in which nails are delivered to driving instrumentalities through a raceway.

Having thus described my invention, what I claim as new and desire to secure by Letters Patent of the United States is:

1. A nail clearing device comprising a rotary disk having a slot extending from its edge face to a point inwardly of said edge face, a nail engaging finger having a sliding fit in said slot with its outer end extending beyond the edge face of the disk, and means normally maintaining the finger in said position but permitting said finger to yield inwardly in said slot under pressure until the finger lies wholly within the edge face of said disk.

2. A nail clearing device comprising a rotary disk having slots therein extending from the periphery of the disk to points inwardly of said periphery, fingers slidably mounted in said slots and having outer nail engaging ends normally extending outwardly beyond the periphery of the disk, and spring-pressed plungers engaging said fingers for holding them outwardly and permitting them to slide inwardly in said slots when pressure is applied to their outer ends.

3. A nail clearing device comprising a rotary disk having a pair of parallel slots therein extending from the periphery of the disk to points inwardly of said periphery, nail engaging fingers slidably mounted in said slots with their forward ends normally extending a short distance beyond the periphery of the disk, resilient means constantly urging said fingers outwardly in said slots but permitting them to yield inwardly under pressure, and means for limiting the outward movement of said fingers.

4. A nail clearing device comprising a rotary disk having a pair of slots therein the outer ends of which extend to the edge face of the disk at diametrically opposite sides thereof, said slots having shoulders formed at their inner ends, nail engaging fingers slidably mounted in said slots with their outer ends normally extending beyond the edge face of the disk, projections on said fingers arranged to engage the shoulders at the inner ends of the slots and limit sliding movement of the fingers outwardly of the disk, and spring-pressed plungers carried by said fingers and engaging the inner ends of the slots, said plungers normally holding the fingers at the outer limit of their sliding movement but permitting them to yield inwardly under pressure applied to their outer ends.

5. A nail clearing device comprising a rotary support, a disk secured to said support having slots therein extending from the periphery of the disk to points within said periphery, fingers slidably mounted in said slots for engaging and dislodging misplaced nails from a nail raceway, means for permitting said fingers to yield inwardly in said slots under pressure applied to their outer ends, and eccentric means for adjusting the rotary support to move the disk toward or away from the raceway.

6. A nail clearing device comprising a rotary support, a disk mounted on said support having a pair of slots formed therein tangential to a circle described about the axis of the support, said slots extending to the periphery of the disk at diametrically opposite sides thereof and terminating inwardly of said periphery in enlarged ends provided with shoulders, nail engaging fingers mounted in said slots for sliding movement lengthwise thereof, said fingers having pointed nail-engaging ends normally extending beyond the periphery of the disk and having projections at their opposite ends arranged to engage the shoulders at the inner ends of the slots and thereby limit outward movement of the fingers relatively to the disk, spring-pressed plungers engaging said fingers and normally maintaining them at the outer limit of their sliding movement but permitting them to yield under pressure until their nail engaging ends at least coincide with the periphery of the disk, and a plate for securing the disk on said rotary support and for confining the fingers in said slots.

7. A nail clearing device for use in machines in which nails are delivered to driving instrumentalities through a raceway over which is mounted a guard member to prevent the nails from passing down the raceway unless they are properly positioned therein, said device comprising a rotary disk carrying a spring-pressed finger the forward end of which normally projects beyond the periphery of the disk and is arranged to engage the guard member during part of each revolution of the disk and to be depressed thereby, said finger being also arranged upon leaving the guard member to be thrown outwardly by its spring to bring its forward end into engagement with an improperly positioned nail and to reject the nail from the raceway or cause it to become properly positioned thereon.

8. A nail clearing device for use in machines in which nails are delivered to driving means through an inclined raceway over which is mounted a guard member to prevent improperly positioned nails from passing down the raceway, said device comprising a rotatable disk provided with oppositely disposed parallel slots having spring-pressed fingers slidably mounted therein the forward ends of which normally extend beyond the periphery of the disk and are arranged, during rotation of the disk, to engage the guard member and be depressed thereby, said fingers being arranged to snap off the end of said guard member to bring their forward ends into position to engage an improperly positioned nail and to reject the nail from the raceway or cause it to become properly positioned therein.

9. In a fastening inserting machine, a raceway for delivering nails to fastening inserting instrumentalities, a guard member over said raceway for engaging a misplaced nail and preventing it from passing down the raceway, and means for dislodging said nail from its improper position comprising a rotary disk mounted over the raceway and provided with a pair of spring-pressed fingers slidably mounted in slots in said disk and arranged to engage the guard member and be depressed thereby during rotation of the disk and, upon leaving the guard member, to snap outwardly of the periphery of the disk into position to engage the misplaced nail and reject it from the raceway or cause it to become properly positioned therein, said fingers having means thereon for limiting their outward movement relatively to said slots.

10. In a fastening inserting machine, a raceway for delivering nails to fastening inserting instrumentalities, a guard member over said raceway for preventing improperly positioned nails from passing down the raceway, said guard member having a curved cam surface thereon, a rotary support located over said raceway adjacent to said guard member, a disk on said support, slots in said disk the outer ends of which extend through its edge face and the inner ends of which have shoulders thereon, fingers slidably mounted in said slots with their outer ends extending beyond the edge face of the disk, spring-pressed plungers carried by said fingers and engaging the inner ends of the slots for urging the fingers outwardly toward the edge face of the disk, projections on said fingers for engaging the shoulders on the slots and limiting outward movement of the fingers, a plate for securing the disk on the rotary support and confining the fingers in said slots, and means for rotating the support and causing each finger to ride over the cam surface on the guard member and to snap off its end into engagement with an improperly positioned nail and reject the nail from the raceway or cause it to become properly positioned therein.

ARVID A. MOLITOR.